ELECTRONIC INFORMATION STORAGE DEVICES

Filed Nov. 3, 1950 2 Sheets-Sheet 1

INVENTORS:
F.C. WILLIAMS
T. KILBURN
G.C. TOOTILL
ATTORNEYS:
Moore and Hall

INVENTORS:
F. C. WILLIAMS
T. KILBURN
G. C. TOOTILL
ATTORNEYS:
Moore and Hall.

United States Patent Office 2,749,439
Patented June 5, 1956

2,749,439

ELECTRONIC INFORMATION STORAGE DEVICES

Frederic Calland Williams, Timperley, Tom Kilburn, Davyhulme, Manchester, and Geoffrey Colin Tootill, Hollinwood, England, assignors to National Research Development Corporation, London, England Application November 3, 1950, Serial No. 193,772

Claims priority, application Great Britain November 14, 1949

6 Claims. (Cl. 250—27)

Figure 1:
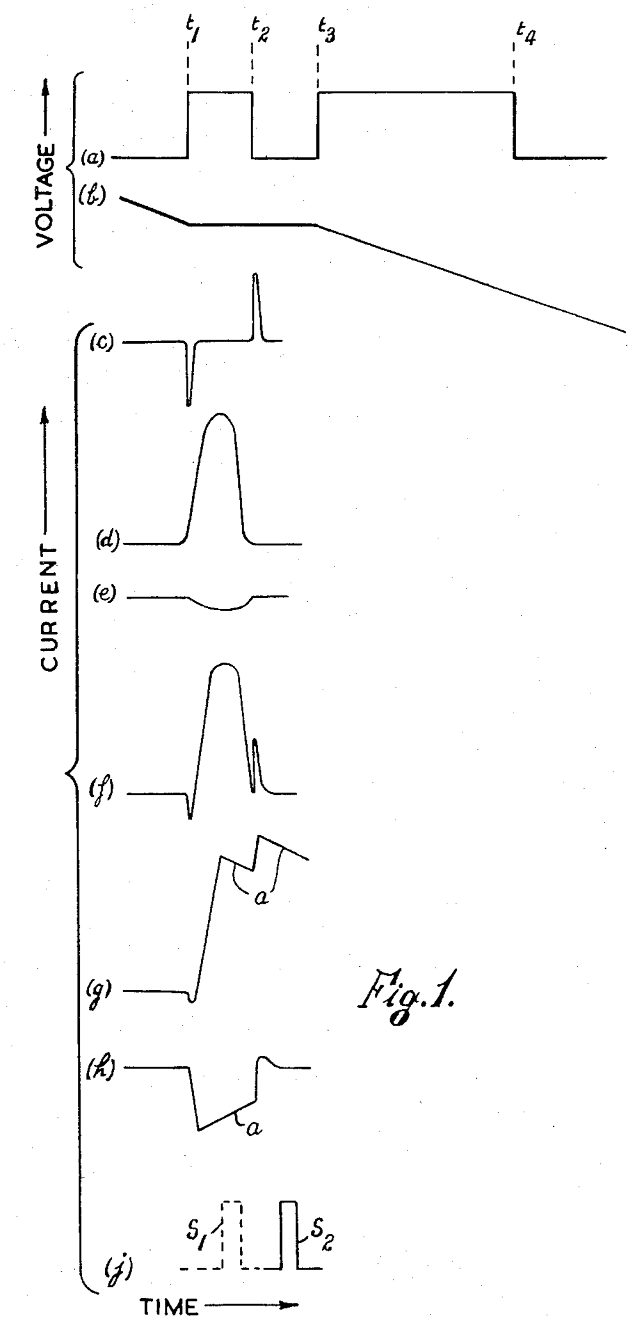

This invention relates to electronic storage devices of the kind employing a cathode ray tube and in which a surface of an insulator, hereinafter referred to as a screen, is bombarded by the cathode ray beam to set up on areas of the surface electric charges representative of the information to be stored.

Examples of devices of this kind are described in the specifications of British Patent No. 645,691 and the U. S. patent application of Frederic C. Williams and Tom Kilburn, Serial Number 165,262, filed May 31, 1950, and in a paper entitled "A storage system for use with binary-digital computing machines," by F. C. Williams and T. Kilburn, in the Proceedings of the Institute of Electrical Engineers, part III, No. 40, March 1949, at pages 81–100.

In devices of this kind it is usual to record information upon an area of the insulating surface by bombarding the area with the electron beam to set up on the area a positive charge by secondary emission. This positive charge is left unchanged in order to record information of one kind (e. g. a digit 0) but is modified in order to record information of another kind (e. g. a digit 1) by bombarding a neighbouring area which releases secondary electrons which pass to the first-named area and reduce or eliminate the positive charge thereon.

This record is subsequently read by bombarding said first area again when a positive impulse is obtained from a signal electrode near to the said insulating surface if the positive charge has been reduced and a negative impulse is obtained if the positive charge has not been reduced.

These impulses are generated for the following reasons:

When the recorded positive charge has been reduced by bombardment of the neighbouring area, subsequent bombardment of the first-named area first increases the positive charge on this area to the previous equilibrium level and in effect introduces a positive charge in the neighbourhood of the signal electrode and thus causes a corresponding pulse of current to flow to the signal electrode. The corresponding voltage pulse produced across the load resistance connected to the signal electrode is therefore positive. On the other hand when the positive charge has not been modified the effect of the subsequent bombardment is merely that the electron beam introduces a cloud of secondary electrons near the signal electrode and thus generates a negative pulse across the load resistance.

When this explanation is considered it will be appreciated that the positive pulse set up when the modified charge is bombarded is really the resultant of a positive pulse due to the increase of the positive charge to the equilibrium level and a negative impulse due to the electron cloud effect. Thus to a certain extent the negative pulse, due to the electron cloud effect, reduces the positive signal pulse. In some cases, depending on the ratio of secondary to primary electrons, which again depends on the velocity of the electrons in the incident beam, the negative pulse due to switching on the beam may altogether mask the positive pulse due to the reestablishment of the positive charge.

It is an object of the present invention wholly or in part to overcome this deleterious effect and thereby to increase the efficiency of devices of the kind set forth.

According to the present invention there is provided an electronic storage device of the kind set forth, wherein for the purpose of reading the charge condition, and hence the information stored, at an area of the said surface, there are provided means for switching the beam on to bombard the area and for subsequently switching the beam off, a circuit having a time constant longer than the time interval between the switching on and off and adapted to produce an approximate integration of the signals generated in a signal electrode close to the surface in response to the switching on and off of the beam and means for strobing or selecting a predetermined portion of the integrated signals after the said switching off of the beam in order to provide an output signal.

Briefly the effect of such an arrangement is as follows:

When information is being read from the cathode ray tube storage device the electron cloud pulses resulting from beam switch-on and beam switch-off substantially cancel each other out in the integrating amplifier. The resultant voltage level in the amplifier will be approximately zero or positive immediately after the first beam switch-on and off according to whether the positive charge originally set up has or has not been modified.

When the information is read and regenerated the waveforms produced are balanced but when information is changed by writing over existing information the waveforms are unbalanced. It then becomes necessary to introduce a special circuit into the integrating amplifier to return it to a standard voltage level at the end of each digit period. Such a special circuit is described in the specification of U. S. patent application Serial No. 175,794, filed July 24, 1950, in the name of Frederick C. Williams and Tom Kilburn.

The invention is applicable to electrostatic storage systems in which meditation pulses are used as described in the specification of U. S. patent application Serial No. 165,262, filed May 31, 1950, in the names of Frederic C. Williams and Tom Kilburn. In the application of the invention to this system the strobe pulses are arranged to occur during the meditation pulses.

The invention will be described with reference to the accompanying drawings which illustrate the derivation of pulses in a storage system in which a positive charge generated by bombarding a dot is modified when required by the nature of the information by extending the dot into a dash as described in U. S. specification Serial No. 50,136, filed September 20, 1948, in the names of Frederic C. Williams and Tom Kilburn, and in which use is made of a meditation pulse as described in U. S. specification Serial No. 165,262, filed May 31, 1950, above referenced.

In the drawings:

Figure 1 contains waveforms illustrating the operation of the invention, and

Figure 2:
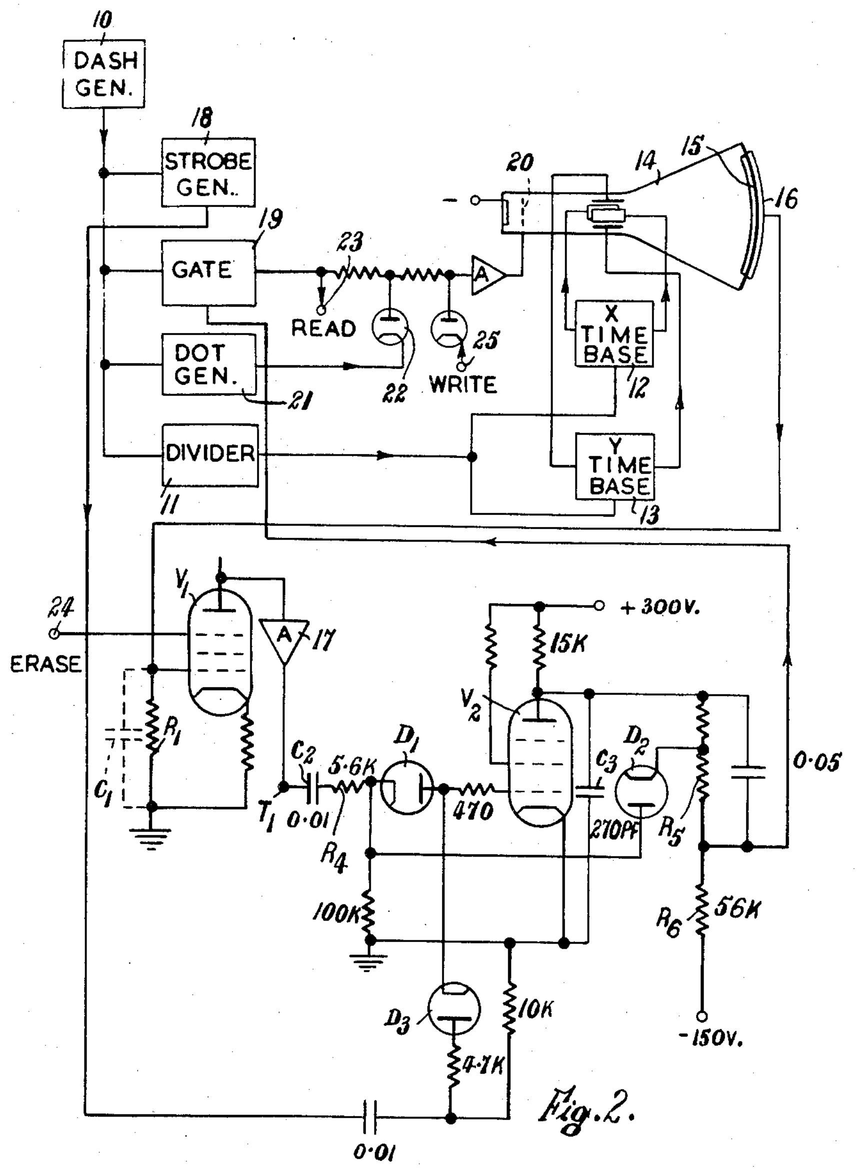

Figure 2 is a circuit diagram of one embodiment of the invention.

Referring to Figure 1, this shows at (*a*) the voltage waveform that may be applied to control the intensity of the cathode ray beam. The dot interval is from $t_1$ to $t_2$ and the whole time allocated to the storage of one digit is from $t_1$ to $t_4$. An interval is provided between $t_4$ and the next digit. Between $t_2$ and $t_3$ the beam is switched off and on again. When a dot is to be recorded the beam is switched on at $t_1$ and off at $t_2$ and remains switched off for the rest of the digit interval. A positive charge is then produced on an area of the insulating surface or screen. If a dash is to be recorded the beam is also switched on from $t_3$ to $t_4$ when the beam is arranged to be directed upon a region of the screen near the said area and secondary emission passes to the said area and at least partially neutralises the positive charge.

The beam may be deflected at a uniform speed over the screen but preferably a stepped voltage waveform of which a small part is shown in Figure 1(*b*) is used. The beam is then held stationary between $t_1$ and $t_3$.

In the remainder of Figure 1, the waveform is shown only over the time $t_1$ to $t_3$ since only this part is relevant to the present invention.

Figure 1(*c*) shows the electron current in the form of negative and positive cloud pulses produced because of the introduction of a cloud of electrons to the screen at switching on and the removal of this cloud at switching off.

Figure 1(*d*) shows the positive pulse produced when exploring with a beam switched as in Figure 1(*a*) an area on which a dash has previously been recorded. This pulse is caused by "re-excavation" of the positive well of charge: or in other words restoring the positive charge to the value it had before receiving secondary emission from an adjacent area in a previous bombardment.

Figure 1(*e*) shows the negative pulse produced by the part of the secondary emission from the said area that falls back on to the screen.

Figure 1(*f*) is the resultant waveform obtained by adding together the waveforms of Figures 1(*c*), (*d*) and (*e*).

Figure 1(*g*) shows the waveform obtained by the approximate integration and amplification of the waveform of Figure 1(*f*).

Figure 1(*h*) shows the integrated and amplified waveform obtained when bombarding with a beam switched as in Figure 1(*a*) an area on which a dot has previously been recorded. In this case, assuming no leakage of charge between the two bombardments, the currents of Figures 1(*d*) and (*e*) are absent and only that of Figure 1(*c*) due to the cloud effect is obtained.

It has been the practice to strobe or select a predetermined portion of the signals from a pick-up electrode coupled to the insulating surface, for example by suitably biasing a gate tube, during the first beam switch-on interval $t_1$ to $t_2$, for instance at $S_1$ in Figure 1(*j*) and it will be seen from consideration of Figures 1(*c*) to 1(*g*) that a dash may yield an integrated waveform, during this period, of positive or negative sign according to the relative values of waveforms (*c*), (*d*) and (*e*). The cloud pulses which have no relation to the nature of the information stored may therefore affect the sign of the signal examined during the interval $S_1$. If, however, strobing occurs after $t_2$ when the beam is switched off, for instance at $S_2$ in Figure 1(*j*), it will be seen that the electron cloud pulses cancel out and the integrated waveform will always be positive when a dash is explored.

In the case of a dot, as shown in Figure 1(*h*), the integrated output during the "meditation" interval $t_2$ to $t_3$ will be zero and strobing during this interval will therefore give no output.

Thus the output produced by strobing during the meditation interval $t_2$ to $t_3$ is either positive or zero according to whether a dash or a dot is being read and is independent of the electron cloud pulses.

The width of the strobe pulse can be decreased when using the present invention since there is no danger of missing information owing to the use of a narrow strobe pulse. It may be necessary to shorten the interval $t_1$ and $t_2$ during which the beam is switched on and to correspondingly lengthen the meditation interval in order to allow time for the information to be passed to a computor and for a change to be made in the recorded information, when necessary, upon instructions from the computor.

Figure 2 shows a circuit for carrying out the invention which corresponds with that described in prior U. S. specification Serial No. 175,794, filed July 24, 1950. To adapt this circuit to the present invention it is only necessary to modify the values of certain components as will hereinafter appear.

A dash generator 10, generating pulses extending between $t_3$ and $t_4$ in Figure 1 applies these pulses to a divider 11 to produce pulses of suitable lower recurrence frequency to synchronise the X and Y time bases 12 and 13 of a cathode ray tube 14. The electrostatic charges are assumed to be stored upon the phosphor screen 15 deposited on the end wall of the tube and a signal or pick-up plate 16 is provided on the outside of this wall.

The valve $V_1$ is the first valve of an amplifier and is associated with an integrating circuit $C_1R_1$. The other valves of the amplifier are omitted for simplicity, but are represented by an amplifier 17. The output terminal $T_1$ of the amplifier is connected through a condenser $C_2$, resistor $R_4$ and a diode $D_1$ to the control grid of a valve $V_2$. The pulses at terminal $T_1$ are arranged, by suitable choice of the number of stages in amplifier 17, to be negative-going in response to the exploration of a dash form of charge on the screen 15. Thus the waveform at $T_1$ is of opposite sign to that in Figure 1(*g*). The valve $V_2$ is arranged to be normally clamped in the conducting condition by the diodes $D_1$, $D_2$ and $D_3$ which are held conducting by the positive-going part of a strobe waveform, such as that indicated in Figure 1(*j*) but of reversed sense so that the strobe pulses $S_2$ are negative-going. The strobe waveform is generated by a strobe pulse generator 18 under the control of pulses from generator 10 and is applied to the anode of $D_3$. If the voltage from the amplifier 17 is negative-going during a strobe pulse when the valve $V_2$ is unclamped, this valve is cut off and the condenser $C_3$ charges up, to be discharged again when the unclamped period ends. A positive-going saw-tooth waveform is thus generated for each negative-going signal from the amplifier 17 and this waveform has at the junction of resistors $R_5$ and $R_6$ a resting level of approximately $-10$ volts. This waveform is applied as a gating pulse to a gate circuit 19, to open the gate and allow dash pulses from generator 10 to pass to the control electrode 20 of tube 14.

Negative-going dot pulses from a generator 21, under the control of the generator 10, are applied through a diode 22, and an amplifier A which reverses their sign, to the control electrode 20, and in the absence of gating pulses applied to gate 19, dots are recorded upon the screen 15. Wherever a gating pulse is applied to gate 19, the dots upon the screen are extended to dashes. In this way the charge pattern upon screen 15 is regenerated, the circuit extending from the signal plate 16 to the gate 19 constituting a regenerative loop circuit.

Information can be read from the store, for example at terminal 23. New information can be written into the store, for example by applying a suitable negative voltage as erasing voltage to terminal 24 to hold the valve $V_1$ cut off (and thus prevent regeneration of dashes) and applying a suitable negative-going dash voltage at terminal 25 (which voltage is positive-going on the grid 20) to convert dots to dashes where appropriate. When this has been done the erasing voltage is removed from terminal 24.

The time constant $C_1R_1$ is made suitably longer than the time $t_1$ to $t_2$: it determines the slope of the portions *a* in Figure 1(*g*) and (*h*). The timing of the negative-going pulses from 18 is made such that the strobing occurs between $t_2$ and $t_3$ in Figure 1.

We claim:

1. An electronic storage device comprising a cathode ray tube, an electric charge-retaining screen, a pick-up plate associated with said screen, means to direct the cathode ray beam of said tube upon an area of said screen, means to switch said beam on to generate a positive charge on said area and subsequently to switch said beam off, a circuit having a time constant longer than the interval between said switching on and off for producing it output terminals of said circuit an approximate integration of signals applied to the input thereof, means to apply signals from said pick-up plate to said input, means for generating selecting pulses occurring after the said switching off of said beam, and means for applying said selecting pulses to select from the integrated signals at said output terminals portions occurring after the switching off of said beam.

2. An electronic storage device comprising a cathode ray tube, an electric charge-retaining screen, a pick-up plate associated with said screen, means to direct the cathode ray beam of said tube recurrently upon an area of said screen, means to switch said beam on to generate a charge on said area and subsequently to switch said beam off, control means to selectively switch said beam on a second time, a circuit coupled to said pick-up plate for effecting an approximate integration of signals in said plate, said circuit having a time constant longer than the time interval between the first-named switching on and off, and means for selecting a predetermined portion of the approximately-integrated output from said circuit after said switching off of said beam and before said second switching-on thereof to generate an output signal.

3. A device according to claim 2, comprising a further circuit for applying said approximately integrated output to said control means to control said selective switching and thereby regenerate the charge upon said area.

4. A device according to claim 3, comprising means for interrupting one of said circuits in order to permit a change to be made in the charge upon the area and hence the writing of new information upon the area.

5. A device according to claim 2, wherein said circuit forms part of a loop circuit serving to couple said pick-up plate to said control means and connected to regenerate the charge upon said area.

6. A device according to claim 5, comprising means for interrupting the loop circuit in order to permit a change to be made in the charge upon the area and hence the writing of new information upon the area.

References Cited in the file of this patent

UNITED STATES PATENTS

| | | |
|---|---|---|
| 2,461,667 | Sunstein | Feb. 15, 1949 |
| 2,493,648 | Watton et al. | Jan. 3, 1950 |
| 2,548,789 | Hergenrother | Apr. 10, 1951 |

OTHER REFERENCES

Dynamically Regenerated Electrostatic Memory System, Eckert et al., Proc. of I. R. E., vol. 38, No. 5, pages 498–510, May 1950.